United States Patent
Lee et al.

(10) Patent No.: US 9,886,183 B2
(45) Date of Patent: Feb. 6, 2018

(54) APPARATUS AND METHOD FOR RECEIVING TOUCH INPUT IN AN APPARATUS PROVIDING A TOUCH INTERFACE

(71) Applicant: Samsung Electronics Co., Ltd., Gyeonggi-do (KR)

(72) Inventors: Yohan Lee, Gyeonggi-do (KR); Jaehyeon Kang, Gyeonggi-do (KR); Boyeon Na, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 840 days.

(21) Appl. No.: 14/294,522

(22) Filed: Jun. 3, 2014

(65) Prior Publication Data

US 2014/0359497 A1   Dec. 4, 2014

(30) Foreign Application Priority Data

Jun. 4, 2013 (KR) .......................... 10-2013-0064038

(51) Int. Cl.
*G06F 3/048* (2013.01)
*G06F 3/0488* (2013.01)
*G06F 3/0486* (2013.01)
*G06F 3/0484* (2013.01)

(52) U.S. Cl.
CPC .......... *G06F 3/0488* (2013.01); *G06F 3/0484* (2013.01); *G06F 3/0486* (2013.01)

(58) Field of Classification Search
CPC ..... G06F 3/0484; G06F 3/0486; G06F 3/0488
See application file for complete search history.

(56) References Cited

U.S. PATENT DOCUMENTS

| | | | |
|---|---|---|---|
| 2006/0132460 A1* | 6/2006 | Kolmykov-Zotov | G06F 3/04812 345/173 |
| 2007/0192731 A1* | 8/2007 | Townsend | G06F 3/0488 715/788 |
| 2009/0174667 A1* | 7/2009 | Kocienda | G06F 3/0237 345/169 |
| 2010/0088596 A1* | 4/2010 | Griffin | G06F 3/041 715/702 |
| 2011/0004821 A1* | 1/2011 | Miyazawa | G06F 3/04883 715/702 |

* cited by examiner

*Primary Examiner* — William Bashore
*Assistant Examiner* — Gregory A Distefano
(74) *Attorney, Agent, or Firm* — The Farrell Law Firm, P.C.

(57) ABSTRACT

An input method of a terminal is provided. The method includes receiving a first input for displaying a selection User Interface (UI); displaying the selection UI on a display unit of the terminal according to the first input; receiving a second input for selecting one or more specific coordinates on the display unit; selecting the one or more specific coordinates among specific coordinates on the display unit based on the second input and the selection UI; and performing functions corresponding to the one or more selected coordinates.

18 Claims, 9 Drawing Sheets

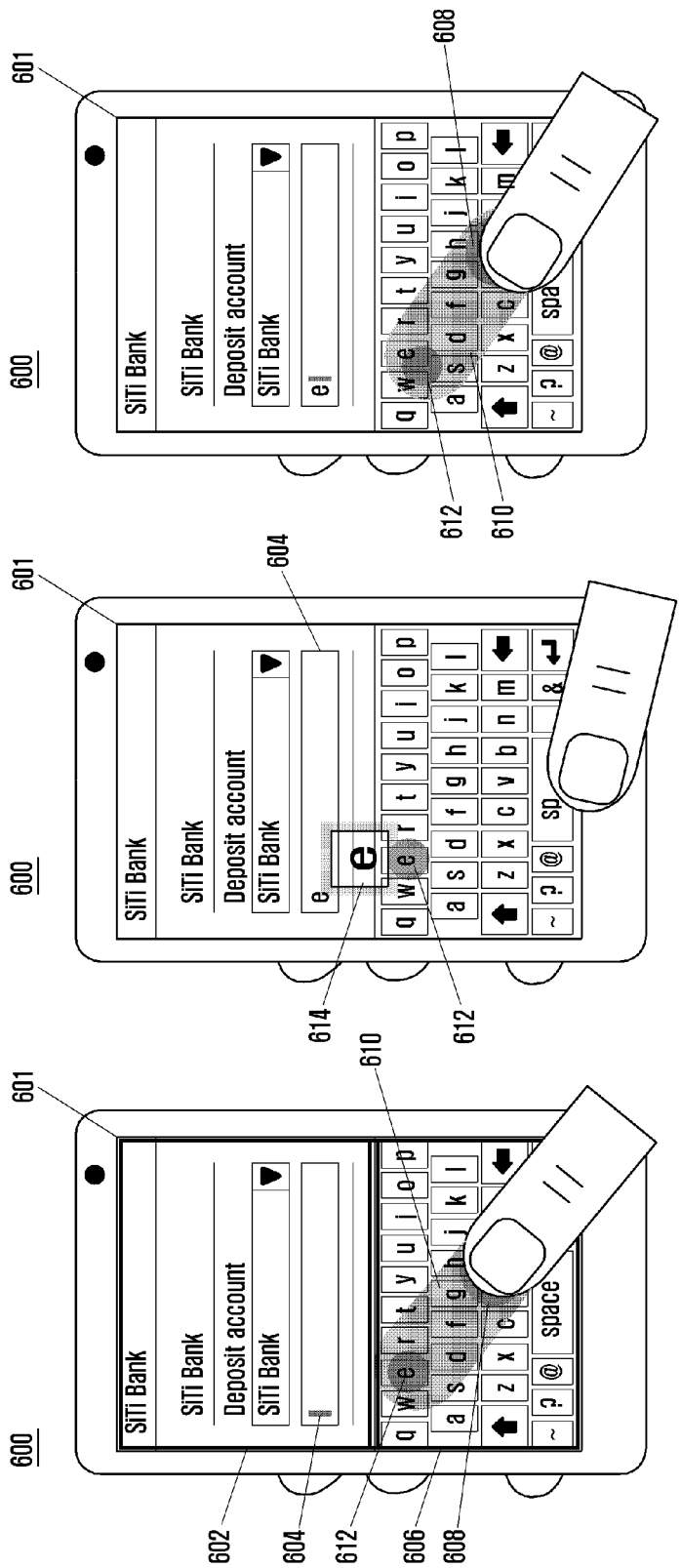

APPARATUS AND METHOD FOR RECEIVING TOUCH INPUT IN AN APPARATUS PROVIDING A TOUCH INTERFACE

PRIORITY

This application claims priority under 35 U.S.C. §119(a) to Korean Patent Application No. 10-2013-0064038, filed in the Korean Intellectual Property Office on Jun. 4, 2013, the entire content of which is incorporated herein by reference.

BACKGROUND

1. Field of the Invention

The present invention generally relates to a method of receiving an input so as to improve a user manipulability in a terminal providing a touch interface and an apparatus thereof, and more particularly, a method and an apparatus for a user to conveniently input an input signal in an area corresponding to an entire input unit in an input situation limited to being able to touch only a part of the input unit in the terminal such as a one-hand input.

2. Description of the Related Art

Recently, electronic terminals which can receive a touch input of a user have become popular according to a development of a technology. The electronic terminals are generally portable and mostly have an input unit and a display unit. More preferably, the input unit and the display unit are formed in a type of a touch screen so that a user can conveniently input a command. Further, the terminal tends to have a big touch screen so as to simultaneously provide a lot of information to a user according to the user's requirement.

As described above, there is a problem in that a lot of information can be simultaneously provided to a user as the size of a touch screen grows, but it may be difficult to input a command corresponding to a whole touch screen of the terminal when an input situation of the portable terminal is limited, such as a situation where the input is performed by one hand with which the user holds the terminal.

In the limited situation as described above, when the user intends to input a command to the terminal with the hand holding the terminal, the user has difficulty in inputting a desired command to an area of the touch screen of the terminal that cannot be reached by the one hand. To solve the problem, a user is made to select an input mode, such as shifting a screen displayed on a whole touch screen to a point where a touch is available, switching the whole screen into a small screen to allow easy inputting in a limited situation, or rearranging an input icon displayed on the whole touch screen at the point where the touch is available. However, if a screen displayed on the touch screen is changed as described above, an operation load of the terminal for an image processing, or the like, is increased. Further, the user maybe confused due to changing the screen and intuitiveness.

SUMMARY

The present invention has been made to address at least the above-mentioned problems and/or disadvantages and to provide at least the advantages described below. Accordingly, an aspect of the present invention is to provide an input method and apparatus by which a user can conveniently perform an input to a terminal. More specifically, an aspect of the present invention is to provide an input method and apparatus by which the user can perform an input corresponding to a whole input unit of the terminal in a limited input situation.

Another aspect of the preset invention is to provide a method in which a user can perform an input to a terminal through an intuitive method. More specifically, convenience of a user can improve in accordance with conveniently inputting a command corresponding to a whole input unit of the terminal in the limited input situation.

In accordance with an aspect of the present invention, an input method of a terminal is provided. The method includes receiving a first input for displaying a selection User Interface (UI); displaying the selection UI on a display unit of the terminal according to the first input; receiving a second input for selecting one or more specific coordinates on the display unit; selecting the one or more specific coordinates among specific coordinates on the display unit based on the second input and the selection UI; and performing a function corresponding to the one or more selected coordinates.

In accordance with another aspect of the present invention, a terminal for receiving a user input is provided. The terminal includes a display unit configured to display an area corresponding to one or more coordinates; an input unit configured to receive a first input for displaying a selection User Interface (UI) on the display unit and a second input for selecting one or more coordinates among the coordinates; and a controller configured to control the display unit to display the selection UI according to the first input, to select the one or more coordinates among the one or more coordinates based on the second input and the selection UI, and to perform a function corresponding to the selected coordinates.

BRIEF DESCRIPTION OF THE DRAWINGS

The above and other aspects, features and advantages of the present invention will be more apparent from the following detailed description in conjunction with the accompanying drawings, in which:

FIGS. 6A to 6E are screen views illustrating an input UI according to another embodiment of the present invention.

DETAILED DESCRIPTION OF EMBODIMENTS OF THE PRESENT INVENTION

Figure 1:
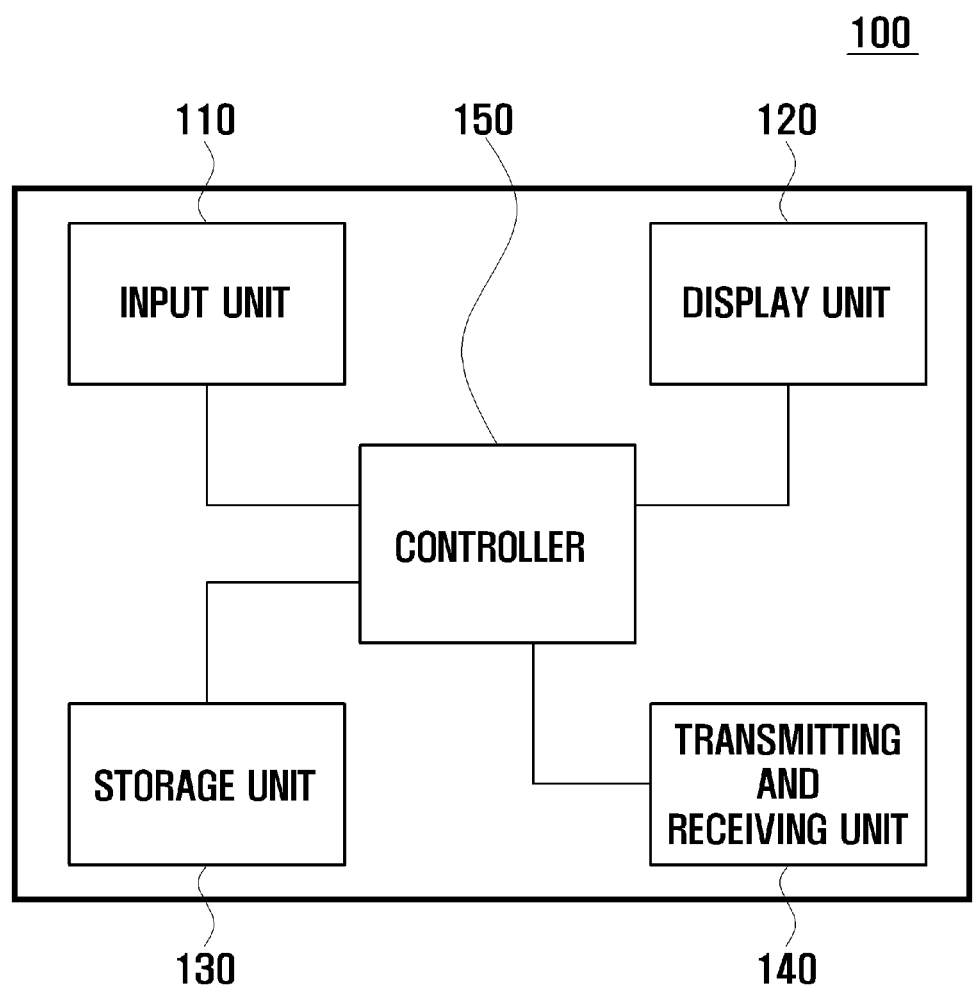
FIG. 1 is a block diagram illustrating a component of a terminal according to an embodiment of the present invention.

Hereinafter, various embodiments of the present disclosure will be described in detail with reference to the accompanying drawings. In describing the embodiments of the present invention, descriptions related to technical contents which are well-known in the art to which the present invention pertains, and are not directly associated with the present invention, will be omitted. Such an omission of unnecessary descriptions is intended to prevent obscuring of the main idea of the present invention and more clearly set forth the main idea.

For the same reasons, some elements are enlarged, omitted, or schematically drawn in the attached drawings. Further, the size of each element does not entirely reflect the actual size. In the drawings, identical or corresponding elements are provided with identical reference numerals.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create a means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including an instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed in the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur not necessarily in the described order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "units", or "modules" or divided into a larger number of elements, "units", or "modules". Moreover, the elements, "units" or "modules" may be implemented to reproduce one or more Central Processing Units (CPUs) within a device or a secure multimedia card. Hereinafter, a portable terminal will be described with reference to drawings. The portable terminal refers to an electronic device including one or more among a mobile phone, a Personal Digital Assistant (PDA), a navigation device, a digital broadcasting receiver and a Portable Multimedia Player. The portable terminal may be applied to not only a clamshell portable terminal but also a bar type, a flip type, a sliding type, a rotating type and a combination type thereof.

A "touch" input includes performing a touch in an input unit of the terminal. When performing the touch input, the terminal may detect at least one of a position of a touch, a touch area, a touch pressure and a touch time.

A "drag" input includes moving while touching in an input unit of the terminal. Further, the drag input may be referred to as a slide input. The terminal may detect at least one of a moving direction and a moving speed while touching in the drag input.

A "hold" input includes stopping while touching in an input unit of the terminal. Further, the hold input may include that the touch area is extended without a steady directivity. The terminal may detect the touch area in the hold input and a change of the touch area.

A "release" input includes a touch that is performed in the input unit of the terminal and then released.

FIG. 1 is a block diagram illustrating a component of a terminal according to an embodiment of the present invention.

Referring to FIG. 1, a terminal 100 includes an input unit 110 which can receive a user's input, a display unit 120 which can display an operation state of the terminal 100, a storage unit 130 which can store input or transmitted and received data of the terminal 100, a transmitting and receiving unit 140 which can communicate with another communication entity and a controller 150 which can control a component of the terminal 100.

The input unit 110 includes a touch input unit which can receive a user's touch input, one or more button input units and a digitizer input unit which can receive an electronic input.

The touch input unit simultaneously receives one or more user's touch inputs, and the touch input includes a slide input. Further, the terminal 100 includes one or more button input units. The button input unit is located in a part of the terminal 100 and receives an input by detecting a physical contact. The digitizer input unit may receive a pressure input, a proximity input, or the like, through an electronic input such as a tablet input device. The terminal 100 determines an operation based on one or more inputs received by the input unit 110. In addition, the touch input unit or the digitizer input unit may be located in a position corresponding to the display unit 120. The input unit 110 and the display unit 120 in a type of the touch screen may be located in an identical area, and a user's input regarding at least one of an image, a video and an icon displayed by the display unit 120 may be received through the input unit 110.

The display unit 120 displays when the terminal 100 is operated or when a User Interface (UI) for receiving a user's input is provided. The display unit 120 is implemented as at least one of a Liquid Crystal Display (LCD) or an Active Matrix Organic Emitting Diode (AMOLED), but not limited thereto.

The storage unit 130 stores at least one of data transmitted and received through a user's input and data transmitted and received through the transmitting and receiving unit 140. Also, a value set by a manufacturer of the terminal 100 may be stored.

The terminal 100 transmits and receives data through the transmitting and receiving unit 140 so as to communicate with another communication entity.

The controller 150 controls operations of components of the terminal 100. More specifically, the controller 150 displays a UI corresponding to a touch input to the display unit 120 based on the touch input through the input unit 110, and performs an operation corresponding to the touch input. The controller 150 displays a selection UI in accordance with a selection UI display input signal received in the input unit 110, moves the displayed selection UI based on a movement input signal received in the input unit, selects an icon corresponding to the input selection input, performs an operation corresponding to the selected icon, determines whether a re-input signal that meets a preset condition is received and displays the selection UI according to the re-input signal. The selection UI is displayed in the display unit 120 corresponding to the user's input, and the user of the terminal selects a specific coordinate displayed on the display unit 120 based on a position of the selection UI. The coordinate may be an icon displayed in the display unit 120, and hereinafter, selecting an icon includes selecting a specific coordinate.

The selection UI is formed by being extended or apart from the position of the display unit 120 corresponding to a user's input received in the input unit 110. The selection UI is moved according to a user's movement signal received in the input unit 110 and an icon in an area in which the selection UI is located is selected and moved according to the received user's selection signal. The selection UI is formed with various types, and a selection UI which can select a specific coordinate on the display unit of the terminal corresponding to an input received in the terminal 100 may be displayed. The selection UI may be extended and displayed on a position of the display unit corresponding to the user's input. In addition, the selection UI may be displayed being spaced apart, by a distance determined based on the user's input, from a position on the display unit corresponding to a user's input. Further, the selection UI may be, for example, a Graphic User Interface (GUI). The selection UI may be displayed in a transparent type on the display unit. When being displayed in the transparent type, the selection UI is displayed overlapped on another item displayed on the display unit. In addition, the selection UI may be moved based on the user's input.

Figure 2:
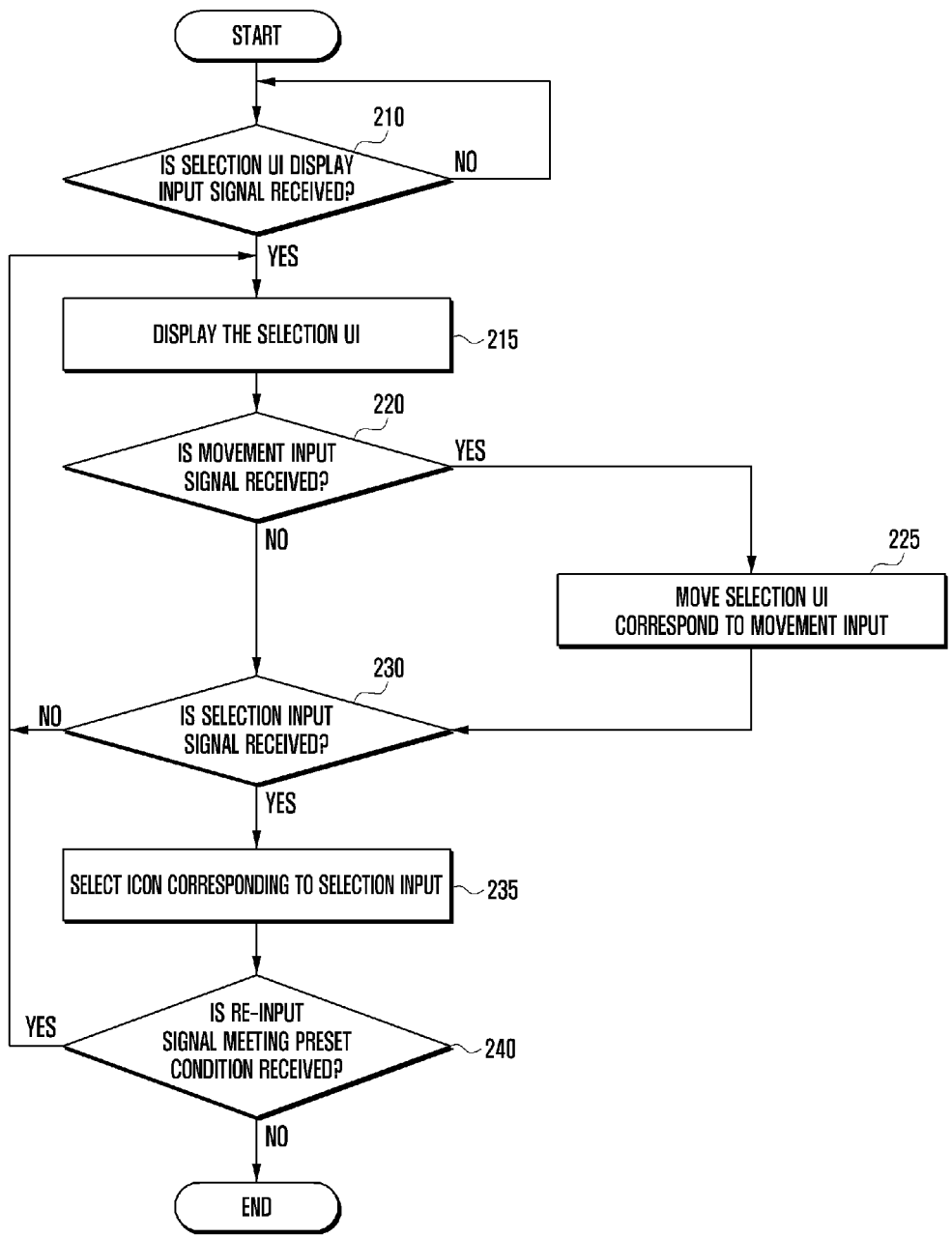
FIG. 2 is a flowchart illustrating an input method according to an embodiment of the present invention.

FIG. 2 is a flowchart illustrating an input method according to an embodiment of the present invention.

Referring to FIG. 2, a terminal determines whether a selection UI display input signal is received in step 210. The selection UI display input signal is displayed in the display unit of the terminal and a user selects a specific coordinate on the display unit through the selection UI or performs at least one of operations which move an icon corresponding to the selected coordinate. For example, the selection UI display input signal is a drag signal received in the input unit of the terminal. The selection UI is displayed in the display unit of the terminal according to a direction of a drag based on the drag signal. As another example, the selection UI display input signal is received in the terminal by performing a button input in the input unit of the terminal or performing a drag input after previously setting a specific mode. As yet another example, a user of the terminal inputs the selection UI display input signal through a hold input after repeating two or more touches within a preset time.

In step 215, the terminal displays the selection UI based on a received selection UI display input signal in step 210. When the selection UI is displayed according to a drag input, a selection UI extended based on a direction of the drag input is displayed. When a touch input continues after the drag input, a size of the selection UI is extended in response to a touch input time, for example, a length of the selection UI is extended in the extended direction. Further, a speed at which the selection UI is extended is determined based on at least one of a touch pressure, a touch area and a speed of a drag input.

In step 220, the terminal determines whether a movement input signal is received. The movement input signal may include a drag input signal that is additionally received in the input unit. Further, the movement input signal may include a drag input that is performed after not touching during a preset time and then touching again.

When the movement input signal has been received in step 220, the terminal moves a selection UI corresponding to the movement input in step 225. The selection UI may be moved corresponding to the drag input, for example, a trailing end of the selection UI which is apart from the user's touch may be moved. Further, the terminal may change a length of the selection UI in order to move the selection UI corresponding to a movement input.

In step 230, the terminal determines whether a selection input signal is received. The selection input signal may include an input for releasing an input which is held in the input unit. The selection input signal may include a signal input through the button input unit of the terminal.

In step 235, the terminal selects an icon (e.g., a specific coordinate) displayed on the display unit based on the selection input signal received in step 230. A selection of the icon (e.g., the specific coordinate) may include selecting at least one of a plurality of icons (e.g., coordinates) located in an area overlapped with the selection UI. More specifically, the selection UI may include a selection area displayed inside or outside of the selection UI. When the selection input signal has been received, at least one of the icons (e.g., coordinates) which are in an area overlapped with the selection area may be selected.

In step 240, the terminal determines whether a re-input signal meeting a preset condition is received. More specifically, the re-input signal may include at least one of a touch input, a hold input and a drag input, which are input within a preset time after the selection input. For example, a corresponding icon through a selection input (e.g., release input) is selected in step 235, and a re-input signal is received in step 240. When the re-input signal has been received in the input unit within the preset time, the terminal proceeds to step 215, and a selection UI is displayed. More preferably, the selection UI is displayed corresponding to a size of the selection UI when a previous selection input has been received.

Figure 3:
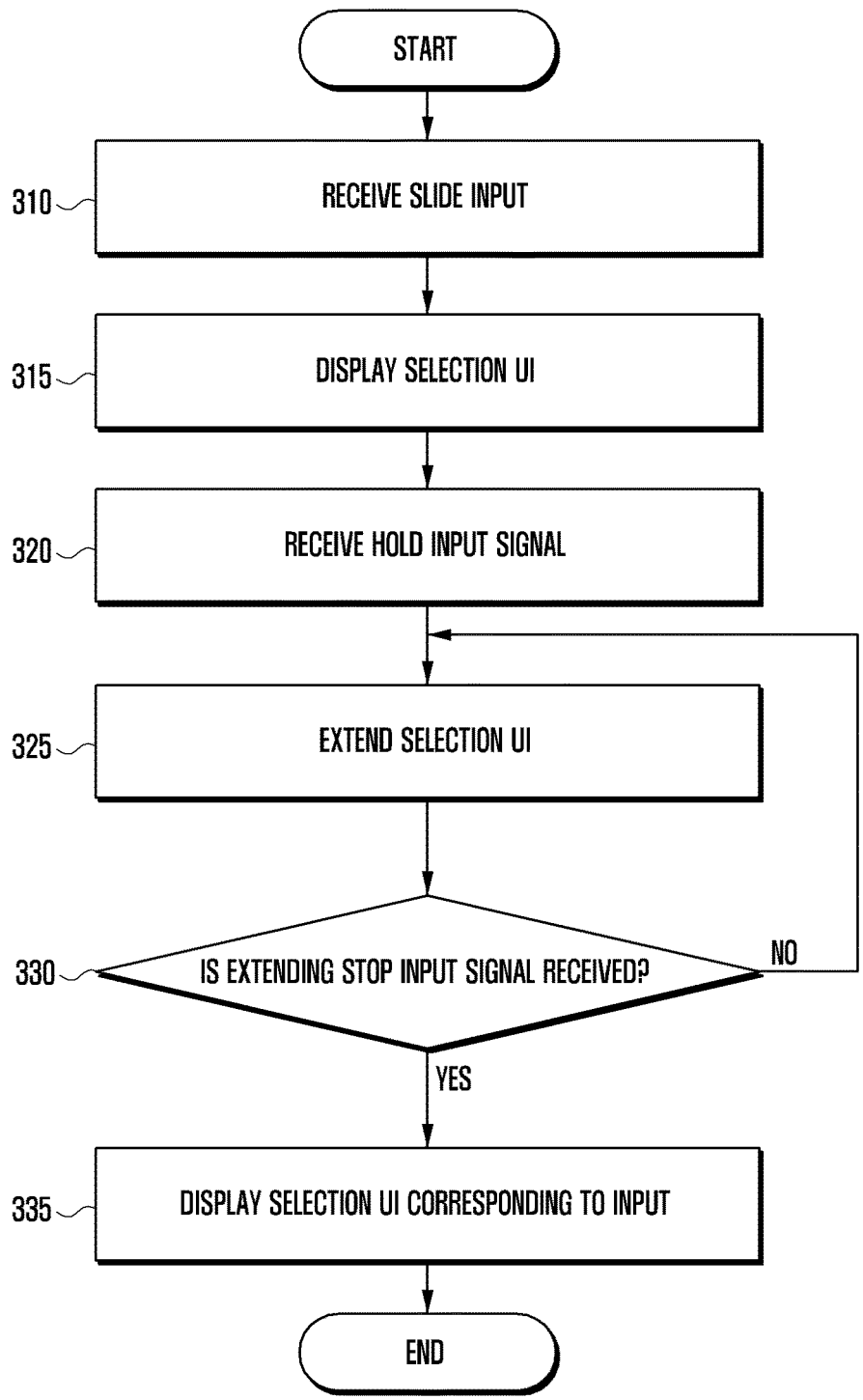
FIG. 3 is a flowchart illustrating an input method according to another embodiment of the present invention.

FIG. 3 is a flowchart illustrating an input method according to another embodiment of the present invention.

Referring to FIG. 3, the terminal receives a slide input signal in step 310. The slide input signal may include a drag input which moves while touching a part of the display unit of the terminal. The terminal may receive at least one of information about a direction, a speed and a touch area of the slide input through the slide input. The slide input may be substituted by two or more touches that are repeated within a constant area of an input unit, and the input unit may calculate a radius of an area on the display unit in which the touch is performed. A step of switching an input mode of the terminal before receiving the slide input may be added, and the terminal may determine whether a selection UI display input according to the added step is received.

In step 315, the terminal displays a selection UI based on the received input signal in step 310. The selection UI may be displayed in a transparent type on an icon displayed on the display unit. A display position of the selection UI may be determined based on the input received.

In step 320, the terminal receives a hold input signal. The hold input signal includes a signal generated by a touch applied to the input unit within a preset area and within a preset time.

In step 325, the terminal extends the selection UI based on at least one of the signal received in step 320 and the signal received in step 310. A direction of extending the selection UI may be determined based on a direction of the slide input received in step 310. The direction of extending the selection UI may be determined based on a direction of a semi-major radius of a touch area in which the touch input is received in step 310. The direction of extending the selection UI may be determined based on a direction of a semi-major radius of a touch area in the hold input received in step 320. Further, an extending speed of the selection UI may be determined based on at least one of signals received in step 310 and step 320. The extending speed of the selection UI may be determined based on at least one of a speed of the slide input received in step 310, a touch speed of a multi touch received in step 310, a touch area of the hold input signal received in step 320, and a pressure of the hold input signal received in step 320. In addition, the terminal may move the selection UI based on at least one of the signal received in step 320 and a signal received in step 310.

In step 330, the terminal determines whether an extending stop input signal is received. The extending stop input signal may include at least one of the drag input and the touch input within the preset time after a release input is performed. For example, when the drag input is performed, an expansion of the selection UI is stopped and the selection UI is moved based on a direction of the drag input.

In step 335, the terminal displays a selection UI according to a user's input. More specifically, when the release input as part of the extending stop input signal is performed, an operation of selecting at least one of the icons in an area, in which the selection UI is displayed, in the display unit may be performed.

FIGS. 4A to 4F are screen views illustrating an input User Interface (UI) according to an embodiment of the present invention.

Referring to FIGS. 4A to 4F, a terminal 400 includes one or more icons 402 to 420 on a display unit 401. When an input selecting the icon has been received, the terminal 400 performs a function corresponding to the icon. The display unit 401 is configured as a touch screen which can display related information and receive a user's input at the same time. Hereinafter, the input unit is configured as the touch screen.

Figure 4A:
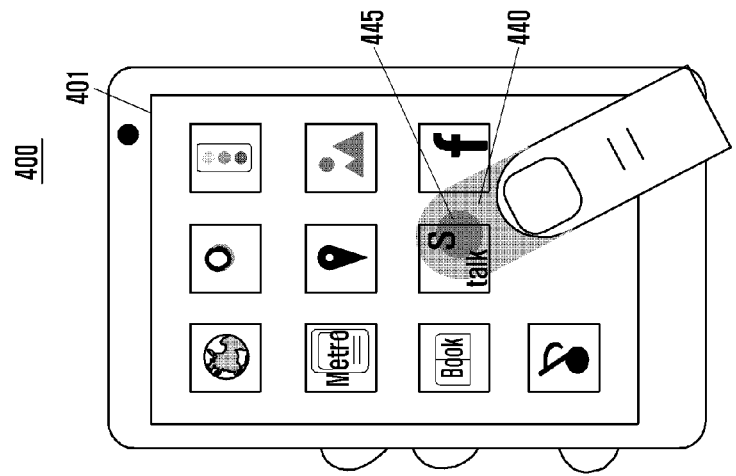
FIGS. 4A to 4F are screen views illustrating an input User Interface (UI) according to an embodiment of the present invention.

Referring to FIG. 4A, the terminal 400 receives a drag input 425. The terminal 400 identifies at least one of a direction and a speed of the drag input.

Figure 4B:
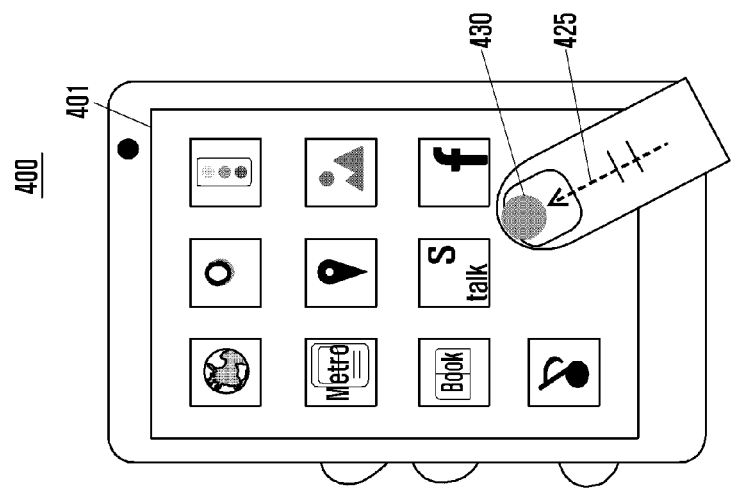

Referring to FIG. 4B, the terminal 400 receives a hold input after a drag input 425 and displays a selection UI based on a dot 430 in which the hold input is received.

Figure 4C:
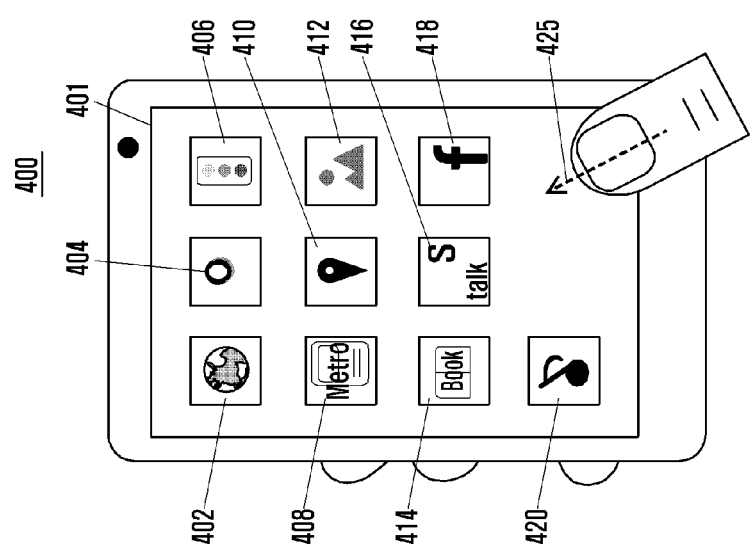

Referring to FIG. 4C, the hold input is continued and an operation for extending a selection UI 440 can be thus performed. The selection UI 440 includes a selection area 445 inside. Further, the selection UI 440 is formed with a transparent type and is simultaneously displayed with another icon or a UI displayed on the display unit 401.

Figure 4D:
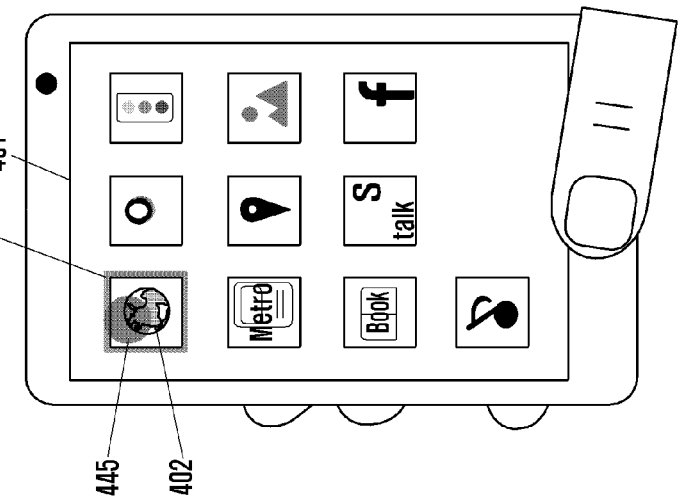

Referring to FIG. 4D, the selection UI 440 is extended according to the hold input. An extending direction of the selection UI 440 is determined based on at least one of a direction in which the slide input is performed and a semi-major radius direction of a touch area at a time of the hold input. Further, an extending speed of the selection UI 440 is determined based on a speed at which the slide input is applied.

Figure 4E:
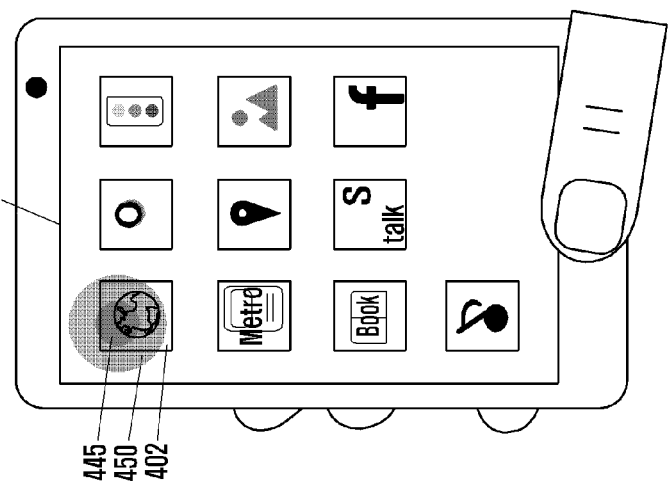

Referring to FIG. 4E, a release input is performed and an icon 402 overlapped with the selection area 445 is selected resulting from performing the release input. An auxiliary UI 450 is displayed around the selection area 445. The selection UI 440 may be formed being apart from the selection area 445 and the auxiliary UI 450 as shown in FIG. 4E.

Figure 4F:
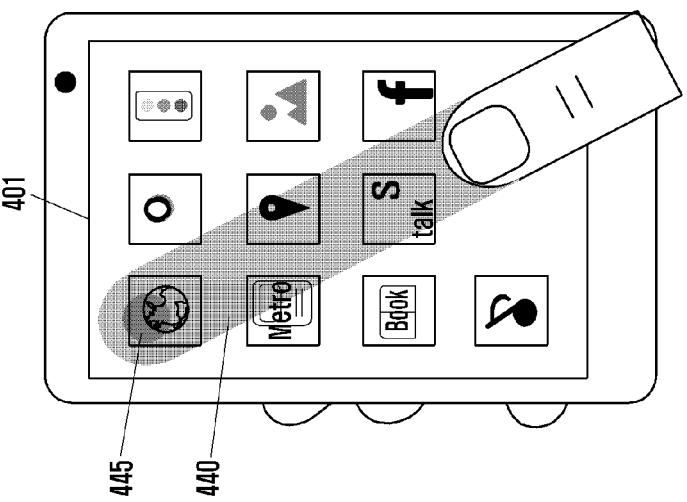

Referring to FIG. 4F, when the release input is continued during a preset time or more, the auxiliary UI 450 indicating that the selected icon 402 is selected is displayed.

As described above, a user can easily input a command to a terminal even in a limited input situation such as a one-hand input confined in a limited area by selecting an icon through the selection UI 440.

FIGS. 5A to 5D are screen views illustrating an input UI according to another embodiment of the present invention.

Referring to FIGS. 5A to 5D, one or more icons are displayed on a display unit 501 of a terminal 500. Further, the one or more icons correspond to one or more coordinates, and a user may select the coordinate based on a position of a selection UI. The display unit 501 is configured as a touch screen which can display related information and receive a user's input at the same time. Hereinafter, the input unit is configured as a touch screen.

Figure 5A:
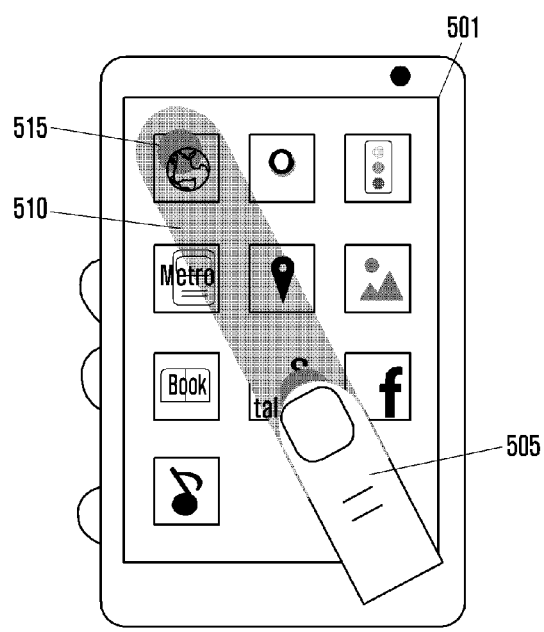
FIGS. 5A to 5D are screen views illustrating an input UI according to another embodiment of the present invention.

Referring to FIG. 5A, a selection UI 510 is displayed by a hold input 505 on the display unit 501 of the terminal 500. The selection UI 510 is extended and displayed according to the hold input 505. In addition, the selection UI 510 may be formed apart from a position in which the hold input 505 is performed. The selection UI 510 includes a selection area 515. The selection area 515 may be formed inside or outside of the selection UI 510. The outside area is adjacent to the selection UI 510. Further, the selection UI 510 may be formed apart from an area in which the hold input 505 is performed.

Figure 5B:
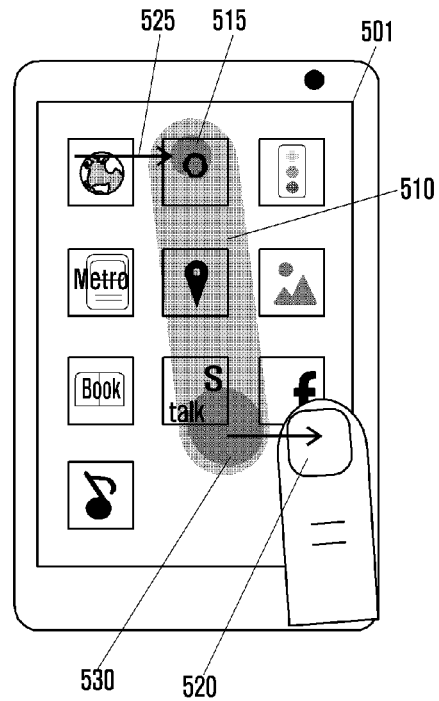

Referring to FIG. 5B, a drag input 520 is received in an input unit of the terminal 500. The selection UI 510 is moved as indicated by reference numeral 525 in response to the drag input 520. A reference point 530 at which the hold input is performed is maintained, and the other end of the selection UI 510 located apart from the reference point 530 is moved corresponding to a movement direction of the drag input 520.

Figure 5C:
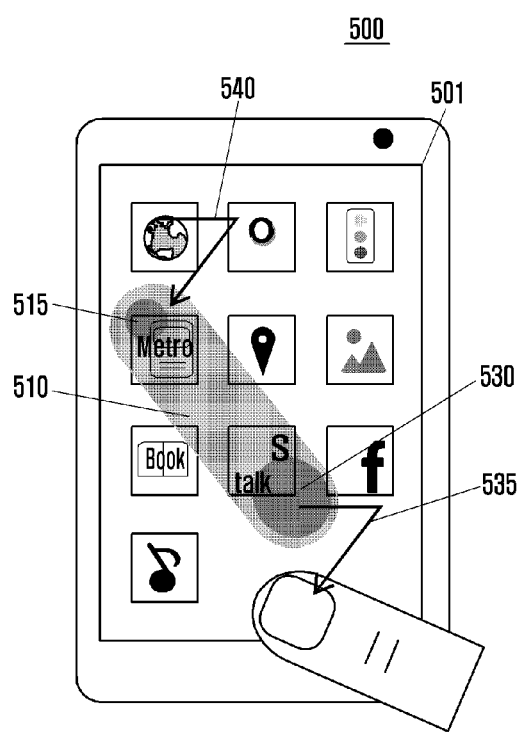

Referring to FIG. 5C, when a drag input 535 in one or more directions has been received in the input unit of the terminal 500, the selection UI 510 is moved as indicated by reference numeral 540 in response to a direction of the drag input 535.

Figure 5D:
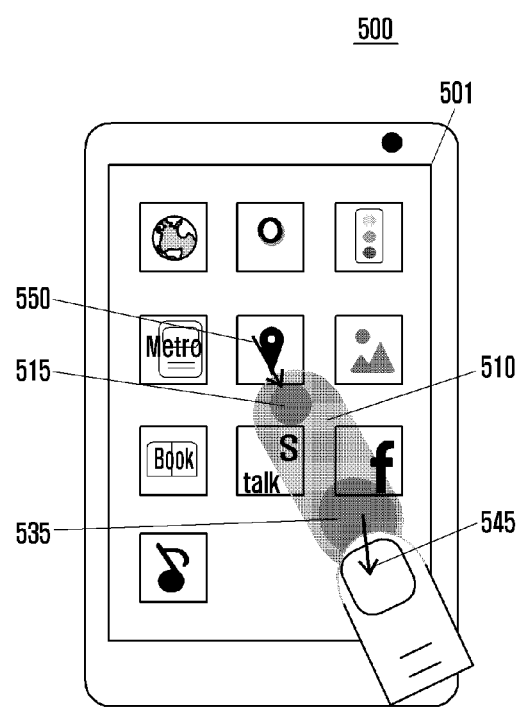

Referring to FIG. 5D, when a drag input 545 in one direction has been received in the input unit of the terminal 500, the selection UI 510 is moved as indicated by reference numeral 550 while adjusting a length in response to the drag input 545.

FIGS. 6A to 6E are screen views illustrating an input UI according to another embodiment of the present invention.

A display unit 601 is configured as a touch screen which can display related information and receive a user's input at the same time. Hereinafter, the input unit is configured as the touch screen.

Referring to FIG. 6A, the display unit 601 of a terminal 600 displays an input display area 602 displaying a command input from a user and information about the command input and a key input area 606 which can receive a user's input. The input display area 602 may include a character display area 604 in which a character input by the user is displayed.

A selection UI 610 is displayed, and the selection UI 610 is moved according to the user's drag input. The selection UI 610 is displayed from a reference point 608 at which the user's drag input is performed, and the selection UI 610 includes a selection area 612 inside or outside.

Referring to FIG. 6B, a selection input is received when the selection area 612 is located in an area formed by an "e" key. The selection input includes a release input. The "e" key is selected by the selection input, and an auxiliary UI 614 informing that the "e" key has been selected is displayed. Further, the selected "e" is displayed in a character display area 604.

Referring to FIG. 6C, a re-selection input is received after a selection input of FIG. 6B. The re-selection input includes a touch input that is performed within a preset time after the release input. The preset time may have a value between 0.1 seconds to 1 second but is not limited thereto. According to the re-selection input, the selection UI 610 displayed in a prior step is displayed again. In addition, the re-selection input includes a touch input that is performed within a predetermined range in a touch position before the release input is performed.

Figure 6D:
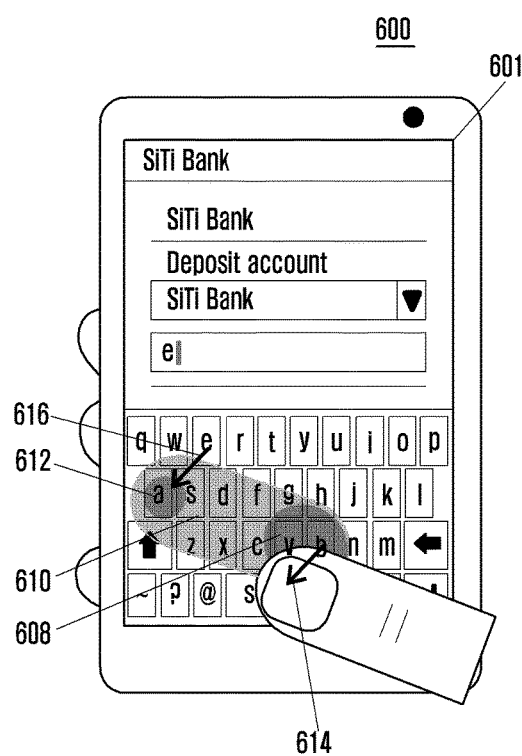

Referring to FIG. 6D, a drag input 614 is received. The selection UI 610 is moved as indicated by reference numeral 616 according to the drag input 614. The moving direction or speed has been described above.

Figure 6E:
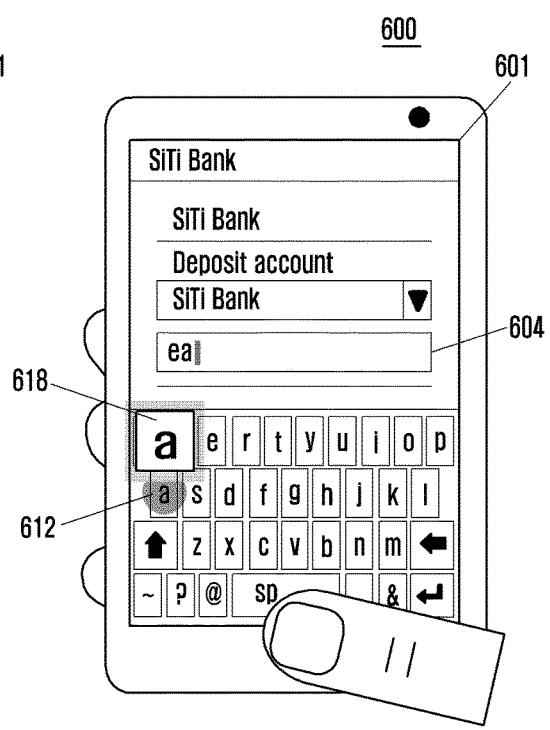

Referring to FIG. 6E, a selection input is received when the selection area 612 is located in an area formed by an "a" key. The selection input includes a release input. The "a" key is selected by the selection input, and an auxiliary UI 614 informing that the a key has been selected is displayed. Further, the selected "a" is displayed in a character display unit 604.

Since the selection UI may be again displayed by a re-selection input after the selection as described above, a continual input can be performed, and a user can easily input a command to a terminal in a limited input situation such as a one-hand input.

Meanwhile, although embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirit of the present invention besides the embodiments disclosed herein can be carried out. Accordingly, the scope of the present invention will be defined by the appended claims and equivalents thereto.

What is claimed is:

1. An input method of a terminal, the method comprising:
receiving a first input for displaying a selection User Interface (UI);
displaying the selection UI on a display unit of the terminal according to the first input;
receiving a second input for selecting one or more specific coordinates on the display unit;
selecting the one or more specific coordinates among specific coordinates on the display unit based on the second input and the selection UI; and
performing a function corresponding to the one or more selected coordinates,
wherein receiving the first input comprises receiving an input for initiating a display of the selection UI and an input for extending the selection UI, and
wherein displaying the selection UI comprises initiating the display of the selection UI based on the input for initiating the display of the selection UI and extending the displayed selection UI based on the input for extending the selection UI.

2. The input method as claimed in claim 1, further comprising:
receiving a third input for moving the selection UI; and
moving the selection UI based on the third input.

3. The input method as claimed in claim 2, wherein receiving the third input comprises receiving a drag input in one or more directions, and wherein moving the selection UI comprises moving the selection UI based on at least one of a direction and a speed of the drag input.

4. The input method as claimed in claim 2,
wherein the input for initiating the display of the selection UI comprises a slide input in a first direction and the input for extending the selection UI comprises a hold input,
wherein displaying the selection UI comprises extending the selection UI during an input time of the hold input in a direction corresponding to the first direction,
wherein receiving the second input comprises receiving a release input, and
wherein receiving the third input comprises receiving a drag input in one or more directions, and further comprises stopping an extension or a movement of the selection UI when the third input has been received.

5. The input method as claimed in claim 1,
wherein displaying the selection UI comprises displaying a selection area inside or outside of the selection UI, and
wherein selecting the one or more specific coordinates comprises selecting one or more specific coordinates among specific coordinates on the display unit based on a position of the selection area.

6. The input method as claimed in claim 1, further comprising:
displaying an auxiliary UI informing that one of the one or more specific coordinates has been selected based on the second input.

7. The input method as claimed in claim 1,
wherein the input for initiating the display of the selection UI comprises at least one of a slide input or a touch input applied two or more times, and the input for extending the selection UI comprises a hold input, and
wherein displaying the selection UI comprises displaying the selection UI based on a direction of the slide input, and extending the selection UI based on the direction of the slide input.

8. The input method as claimed in claim 1, further comprising:
receiving a sixth input for stopping an extension or a movement of the selection UI; and
displaying the selection UI in a fixed size based on the sixth input.

9. The input method as claimed in claim 1, further comprising:
displaying only a part of the selection UI according to the second input; and
displaying the selection UI when a touch input has been received in the terminal within a preset time.

10. A terminal for receiving a user input, the terminal comprising:

a display configured to display an area corresponding to one or more coordinates;
an input device configured to receive a first input for displaying a selection User Interface (UI) on the display unit and a second input for selecting one or more coordinates among the coordinates; and
a controller configured to control the display unit to display the selection UI according to the first input, to select the one or more coordinates among the one or more coordinates based on the second input and the selection UI, and to perform a function corresponding to the one or more selected coordinates,
wherein receiving the first input comprises receiving an input for initiating a display of the selection UI and an input for extending the selection UI, and
wherein the controller is further configured to control the display to initiate the display of the selection UI based on the input for initiating a display of the selection UI and extend the displayed selection UI based on the input for extending the selection UI.

11. The terminal as claimed in claim 10, wherein the input unit is configured to receive a third input for moving the selection UI, and wherein the controller is configured to move the selection UI based on the third input.

12. The terminal as claimed in claim 11, wherein the third input includes a drag input in one or more directions, and wherein the controller is configured to move the selection UI based on at least one of a direction and a speed of the drag input.

13. The terminal as claimed in claim 11,
wherein the input for initiating the display of the selection UI includes a slide input in a first direction and the input for extending the displayed selection UI comprises a hold input,
wherein the second input includes a release input,
wherein the third input includes a drag input in one or more directions, and
wherein the controller is configured to extend the selection UI during a input time of the hold input in a direction which corresponds to the first direction, and to stop an extension or a movement of the selection UI when the third input has been received.

14. The terminal as claimed in claim 10, wherein the controller is configured to display a selection area inside or outside of the selection UI, and to select one or more icons corresponding to the selected coordinates based on a position of the selection area.

15. The terminal as claimed in claim 10, wherein the controller is configured to display an auxiliary UI informing that the selected coordinate has been selected based on the second input.

16. The terminal as claimed in claim 10,
wherein the input for initiating the display of the selection UI comprises includes at least one of a slide input or a touch input applied two or more times, and the input for extending the displayed selection UI comprises a hold input, and
wherein the controller is configured to display the selection UI based on a direction of the slide input, and to extend the selection UI based on the direction of the slide input.

17. The terminal as claimed in claim 10, wherein the input unit is configured to receive a sixth input for stopping an extension or a movement of the selection UI, and wherein the controller is configured to display the selection UI in a fixed size based on the sixth input.

18. The terminal as claimed in claim 10, wherein the controller is configured to display only a part of the selection UI according to the second input and to display the selection UI when a touch input has been received in the input unit within a preset time.

* * * * *